T. J. Mayall
Slate
Nº 27,818.  Patented Apr. 10, 1860.

Witnesses.
Robt L. Harris
Albert W. Brown

Inventor.
Thos. J. Mayall

UNITED STATES PATENT OFFICE.

THOMAS J. MAYALL, OF ROXBURY, MASSACHUSETTS.

ARTIFICIAL SLATE.

Specification of Letters Patent No. 27,818, dated April 10, 1860.

*To all whom it may concern:*

Be it known that I, THOMAS J. MAYALL, of Roxbury, in the county of Norfolk and State of Massachusetts, have invented certain new and useful Improvements in slates or tablets that are susceptible of being marked or written upon by a suitable pencil, and the marks or writing so made erased at pleasure; and I do hereby declare that the following description, taken in connection with the accompanying drawings hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings represent my new slate.

Figure 1:
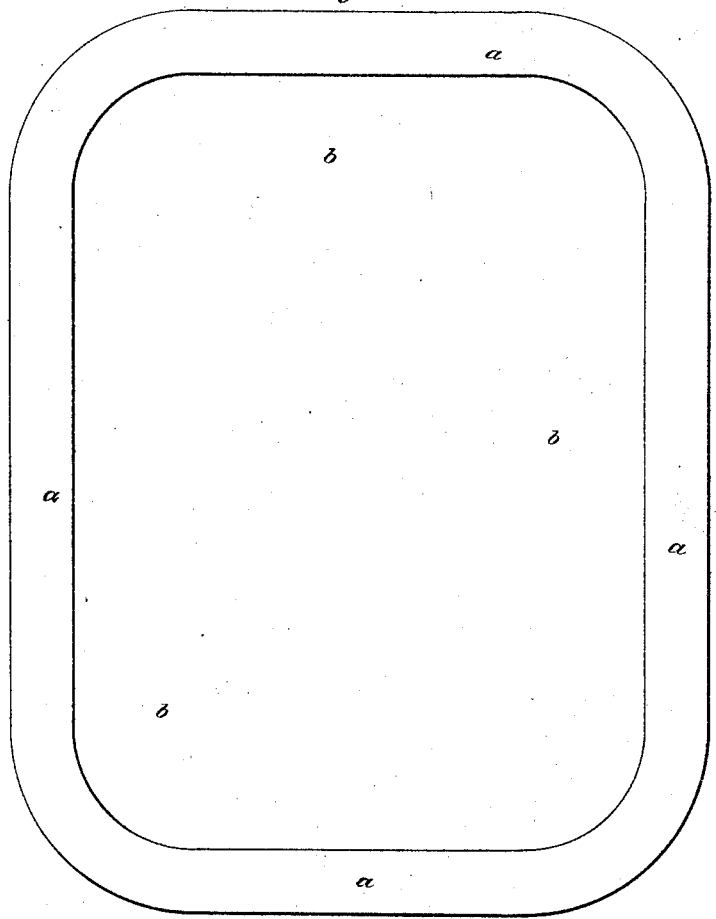
Figure 2:
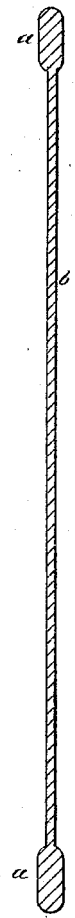
Figure 3:
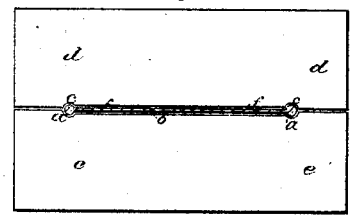

Figure 1 is a side elevation of the slate. Fig. 2 is a central transverse vertical section of the same. Fig. 3 is a sectional view of the molds in which the slate is formed.

The slates or tablets heretofore used, the marks or writings upon which are susceptible of being erased, and from the nature of the material of which they are made, are extremely liable to be broken while the frames in which they are set and held are easily and frequently disjointed and their use in schools is objectionable from the noise occasioned by their dropping or being moved upon the desks of the scholars and from their scratching and defacing the surface of the desks.

My invention consists in a new method of making slates or tablets in such a manner, that they can not be broken by being dropped or by receiving blows, while they make no noise in being moved about upon a desk and can not deface the same. I accomplish these results by making the frame of the slate of a composition of india rubber or gutta percha or of either of these with other substances, the portion of the slate which is to be written upon, being made of india rubber or gutta percha, emery, or sand or other gritty material and sulfur, compounded in any desired proportions. The frame is formed in a mold in one piece and is composed of the ordinary elastic rubber or gutta percha compound well known to rubber manufacturers.

The tablet of the slate, I prefer to make of the following proportions, viz.; 15 lbs. of emery or sand, 1 lb. of rubber or gutta percha and 5 oz. of sulfur, to which may be added lampblack or other coloring matter. The composition thus formed is then placed in metallic molds, subjected to pressure, and heated from 15 minutes to 4 hours at a temperature of from 260° to 300° Fahrenheit, much less time being required when a high pressure is used than when a low pressure only is obtained. This composition thus heated becomes hard and durable and can not easily be broken by dropping or by other accidents, and also forms an excellent substitute for a slate.

The frame $a\,a$ and the tablet $b\,b$ of the slate can be formed and united together in one mold, as shown in Fig. 3, the soft, elastic rubber or gutta-percha composition, of the frame, being inserted in the grooves $c\,c$ of the molds $d$ and $e$ and the composition for the tablet in the central and main portion $f\,f$ of the molds, the two being pressed and heated or cured in the molds together.

The form and shape of the slate and its frame thus made can of course be endlessly varied and ornamented, by constructing the molds in which the compositions are pressed and molded, while being heated, accordingly.

The compositions I have named and the degrees of heat to be used admit of great variations, and I do not therefore limit myself to the proportions described or to the degree of heat to be employed.

Having thus described my improvements, I shall state my claim as follows:

I claim as an article of manufacture—

A slate produced in the manner described, by combining in one piece and without seam or joint, the frame made of soft or elastic rubber or gutta percha and the tablet formed of rubber or guttapercha with which emery or sand or other gritty material is incorporated and constituting a comparatively hard and rigid substance as set forth herein.

THOS. J. MAYALL.

Witnesses:
  ROBT. L. HARRIS,
  ALBERT W. BROWN.